US012609369B2

(12) United States Patent (10) Patent No.: US 12,609,369 B2
Kellner et al. (45) Date of Patent: Apr. 21, 2026

(54) TRACTION BATTERY SYSTEM OF A MOTOR VEHICLE

(71) Applicant: Dr. Ing. h.c. F. Porsche Aktiengesellschaft, Stuttgart (DE)

(72) Inventors: Philipp Kellner, Rennigen (DE); Ilija Brandic, Pleidelsheim (DE); Immanuel Vogel, Steinheim (DE); Christopher Volkmer, Niefern-Öschelbronn (DE); Sascha Mostofi, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 844 days.

(21) Appl. No.: 17/898,551

(22) Filed: Aug. 30, 2022

(65) Prior Publication Data

US 2023/0070257 A1 Mar. 9, 2023

(30) Foreign Application Priority Data

Sep. 6, 2021 (DE) ..................... 10 2021 122 980.4

(51) Int. Cl.
H01M 10/613 (2014.01)
B60K 1/04 (2019.01)
(Continued)

(52) U.S. Cl.
CPC ............. H01M 10/613 (2015.04); B60K 1/04 (2013.01); B60L 50/64 (2019.02); B60L 58/26 (2019.02);
(Continued)

(58) Field of Classification Search
CPC ............. H01M 10/613; H01M 10/625; H01M 50/3425; H01M 50/291; H01M 50/204;
(Continued)

(56) References Cited

U.S. PATENT DOCUMENTS 9,254,609 B2 2/2016 Choi et al.
9,741,983 B2 8/2017 Poller et al.
(Continued)

FOREIGN PATENT DOCUMENTS

CN 111446397 A * 7/2020 ............ H01M 50/35
CN 112531246 A * 3/2021 .......... H01M 10/658
(Continued)

OTHER PUBLICATIONS

Machine translation of CN-111446397-A (Year: 2025).*
Machine translation of CN-112531246-A (Year: 2025).*

*Primary Examiner* — Tong Guo
*Assistant Examiner* — Albert Michael Hilton
(74) *Attorney, Agent, or Firm* — Buchanan Ingersoll & Rooney PC

(57) ABSTRACT

A traction battery system of a motor vehicle, including at least two battery modules which each include a plurality of batteries. The battery module includes a module housing including a housing case and at least one housing cover. The battery module includes a venting unit having a vent opening and having a bursting element. Gas can be discharged from the module housing via the vent opening. The traction battery system includes a first longitudinal support and a second longitudinal support between which the battery modules are disposed. The longitudinal support has a vent chamber which is configured to receive and pass the gas flowing via the venting unit. A cooling chamber, which extends along the vent chamber, is configured separately from the vent chamber for cooling the gas flowing in the longitudinal support.

17 Claims, 2 Drawing Sheets

(51) Int. Cl.

| | |
|---|---|
| *B60L 50/64* | (2019.01) |
| *B60L 58/26* | (2019.01) |
| *H01M 10/625* | (2014.01) |
| *H01M 50/204* | (2021.01) |
| *H01M 50/291* | (2021.01) |
| *H01M 50/342* | (2021.01) |

(52) U.S. Cl.
CPC ....... *H01M 10/625* (2015.04); *H01M 50/204* (2021.01); *H01M 50/291* (2021.01); *H01M 50/3425* (2021.01); *B60K 2001/0438* (2013.01); *H01M 2220/20* (2013.01); *Y02E 60/10* (2013.01)

(58) Field of Classification Search
CPC .... H01M 2220/20; B60L 50/64; B60L 58/26; B60K 1/04; B60K 2001/0438; Y02E 60/10
See application file for complete search history.

(56) References Cited

U.S. PATENT DOCUMENTS

| 2015/0030893 A1* | 1/2015 | Mack .................... H01M 50/30 |
|---|---|---|
| | | 429/56 |
| 2018/0040930 A1 | 2/2018 | Addanki et al. |
| 2019/0140235 A1 | 5/2019 | Lindstrom et al. |
| 2019/0221802 A1 | 7/2019 | Maguire et al. |

FOREIGN PATENT DOCUMENTS

| DE | 102011100626 A1 | 11/2012 |
|---|---|---|
| DE | 102012213308 A1 | 9/2013 |
| DE | 102014207403 A1 | 10/2015 |
| DE | 102017117354 A1 | 2/2018 |
| DE | 102019100955 A1 | 7/2019 |
| DE | 102018210307 A1 | 1/2020 |
| DE | 102019102226 A1 | 7/2020 |
| JP | 2021048113 A | 3/2021 |
| WO | 2021053133 A1 | 3/2021 |

* cited by examiner

TRACTION BATTERY SYSTEM OF A MOTOR VEHICLE

CROSS-REFERENCE TO RELATED APPLICATION

This application claims priority to German Patent Application No. 10 2021 122 980.4, filed Sep. 6, 2021, the content of such application being incorporated by reference herein in its entirety.

FIELD OF THE INVENTION

The invention relates to a traction battery system of a motor vehicle.

BACKGROUND OF THE INVENTION

Motor vehicles comprising traction battery systems are well-known. The traction battery system is a plurality of battery modules comprising a plurality of battery cells which are configured for electrically driving the motor vehicle. The plurality of battery cells are bundled to form a battery module, whereby multiple battery modules are accommodated in a battery housing of the traction battery. The traction battery system is accommodated in a receiving space of a body of the motor vehicle.

During operation of the traction battery system, so-called degassing of a battery cell can occur, for example due to a so-called thermal event, whereby resulting gases are discharged from the traction battery system in a controlled manner. To discharge the gases, a venting unit is provided, which comprises a bursting element that can yield when the internal pressure in the battery module increases as a result of the gases and can unblock a vent opening associated with the venting unit so that the gases can escape from the battery module.

DE 10 2018 210 307 A1, which is incorporated by reference herein, discloses an electric vehicle with a traction battery system comprising a plurality of battery cells which each have a housing and a venting unit, whereby the traction battery system is fastened to a body of the electric vehicle by means of a support structure, and wherein the support structure comprises a cavity which is fluidically connected to the venting units such that a fluid exiting the housings via the venting units can be discharged via the cavity of the support structure.

WO 2021/053133 A1, which is incorporated by reference herein, discloses a traction battery system of a motor vehicle, which comprises a housing, a plurality of battery cells disposed in said housing and a base plate, wherein the battery cells are disposed on the base plate. The base plate comprises a cavity, wherein the cavity is fluidically connected to the housing via a vent opening.

A motor vehicle with a traction battery system is known from CN 112531246 A, which is incorporated by reference herein, wherein the traction battery system is configured with a frame for fastening the traction battery system to a body of the motor vehicle and a plurality of battery modules fastened to the frame, wherein the frame comprises a cavity which is fluidically connected to the battery modules via a respective opening and serves to discharge gases produced during a thermal event.

DE 10 2011 100 626 A1, which is incorporated by reference herein, discloses a traction battery system of a motor vehicle, wherein the traction battery system comprises a vent opening that is fluidically connected to a cavity of a support of a support structure of the motor vehicle.

A traction battery system of a motor vehicle is known from the DE 10 2019 100 955 A1 and DE 10 2017 117 354 A1, which are each incorporated by reference herein, wherein the traction battery system comprises a plurality of battery cells which each comprise a vent element, wherein the vent elements are fluidically connected to a vent manifold.

SUMMARY OF THE INVENTION

A traction battery system according to aspects of the invention of a motor vehicle includes at least two battery modules which each comprise a plurality of batteries, wherein the battery module has a module housing comprising a housing case and at least one housing cover. The battery module comprises a venting unit having a vent opening and having a bursting element, wherein gas can be discharged from the module housing via the vent opening. The traction battery system comprises a first longitudinal support and a second longitudinal support between which the battery modules are disposed. The longitudinal support comprises a vent chamber which is configured to receive and pass the gas flowing via the venting unit. According to aspects of the invention, a cooling chamber which extends along the vent chamber is configured separately from said vent chamber for cooling the gas flowing in the longitudinal support. The advantage of the invention is the reduction of a temperature of the hot gas flowing in the vent chamber, as a result of which damage, for example to further battery modules or at least one further battery module, due to the hot gas is significantly reduced.

With the aid of the vent chamber, which is configured in the longitudinal support and typically extends in the direction of a body longitudinal axis of the motor vehicle, the gases that occur, for example during degassing of one or more batteries, for example due to a thermal event, can thus be discharged in a controlled manner. The gases are discharged from the system such that the gases are cooled as they are being discharged, so that further, in particular sensitive components, such as other intact batteries are not damaged by the hot gases. The cooling of the discharged gas leads to a substantial reduction in temperature, as a result of which components adjacent to the longitudinal support are not heated or are heated to a lesser extent, for example by heat transfer.

The separate configuration of the cooling chamber and the vent chamber results in a preferred cooling, because cooling media can be used, for example, that are not routed to the outside with the gas in the vent chamber and thus discharged. It is also possible to realize a simple air cooling as a result of flow of air through the cooling chamber.

Cooling also reduces a reactivity of the gas with oxygen of fresh air, which enables further damage limitation.

The implementation of the vent chamber in the longitudinal support has the further advantage of preventing flame formation, because the gas flowing out of the module housing can flow along as long a path as possible in a channel of limited size and can thus cool additionally before it can react with a large amount of oxygen from the ambient air.

The longitudinal support advantageously comprises the cooling chamber. A cooling chamber configured adjacent to the vent chamber can thus easily be provided as well. Due to wall heat transfer, the cooling chamber being adjacent to the vent chamber results in particularly effective cooling.

The longitudinal support is advantageously and cost-effectively produced using a method of extrusion molding or in an extrusion process. Different chamber profiles can thus easily be realized, whereby the chambers can be realized according to an extension of the longitudinal support and then extend all the way through said longitudinal support.

In a further advantageous configuration, the venting unit comprises an auxiliary channel disposed between the vent opening and the vent chamber in addition to the vent chamber. The auxiliary channel can thus be used as a deflection channel, for example if the vent chamber, or in other words the longitudinal support, is not implemented at the same height as the vent opening. The auxiliary channel makes it possible to provide a reliable venting unit, even in complex designs. The auxiliary channel is advantageously configured in the housing cover or in a tube element configured adjacent to said housing cover.

In a further configuration, a sealing element is configured between the auxiliary channel and the vent chamber, so that overflow from the auxiliary channel past the vent channel is prevented.

A valve is advantageously disposed in the auxiliary channel. This can prevent gas from the vent chamber from entering the module housing. This is advantageous in particular because, during degassing, an entry of fresh, oxygenated air into the module housing through the vent openings, which are open as a result of the destroyed or opened bursting elements, can lead to a greatly increased speed of a chemical reaction between the gas and the oxygen of the fresh air.

In a further configuration of the traction battery system according to aspects of the invention, the battery modules are disposed in series transverse to a direction of travel of the motor vehicle between the longitudinal supports, wherein in each case only one battery module is accommodated between the longitudinal supports in the direction of a longitudinal axis of the traction battery system. In other words, in each case only one module housing is accommodated between the longitudinal supports in the direction of travel or viewed along the longitudinal axis, whereby a plurality of module housings are disposed one behind the other between the longitudinal supports. This makes it possible to achieve an improved stability of the traction battery system.

The longitudinal supports are preferably disposed in the region of rocker panels of a body of the motor vehicle.

In a further configuration, the housing case is inexpensively produced in an extrusion process in the form of a hollow profile and can be closed on at least one of its open ends by means of the housing cover. In this way, an inexpensive module housing can be provided which at least partly comprises the venting unit.

A joining element can be disposed in the vent chamber as well, for example for fastening a base plate that covers the traction battery system.

The vent chamber is advantageously completely closed at its end which is configured facing toward a body front of the motor vehicle, so that the gas flowing in the vent chamber is directed toward a rear end of the body.

If the bursting element has a higher pressure resistance with respect to a pressure applied to a side of the bursting element which is configured facing away from the module housing than with respect to a pressure applied to a side of the bursting element which is configured facing toward the module housing, a flow of gas into the module housing via the vent chamber can advantageously be prevented.

Thus a traction battery system of a motor vehicle is provided, which makes optimum use of installation spaces in the motor vehicle for the greatest possible customer benefit. As a whole, the traction battery system has a simple and consequently inexpensive design and a reduction of the speed of the thermal event can be achieved.

BRIEF DESCRIPTION OF THE DRAWINGS

Further advantages, features and details of the invention will become apparent from the following description of preferred design examples and from the drawing. The features and combinations of features mentioned above in the description and the features and combinations of features mentioned below in the description of the figures and/or shown alone in the figures can be used not only in the respectively indicated combination, but also in other combinations or on their own without departing from the scope of the invention. The figures show.

DETAILED DESCRIPTION OF THE INVENTION

Figure 1:
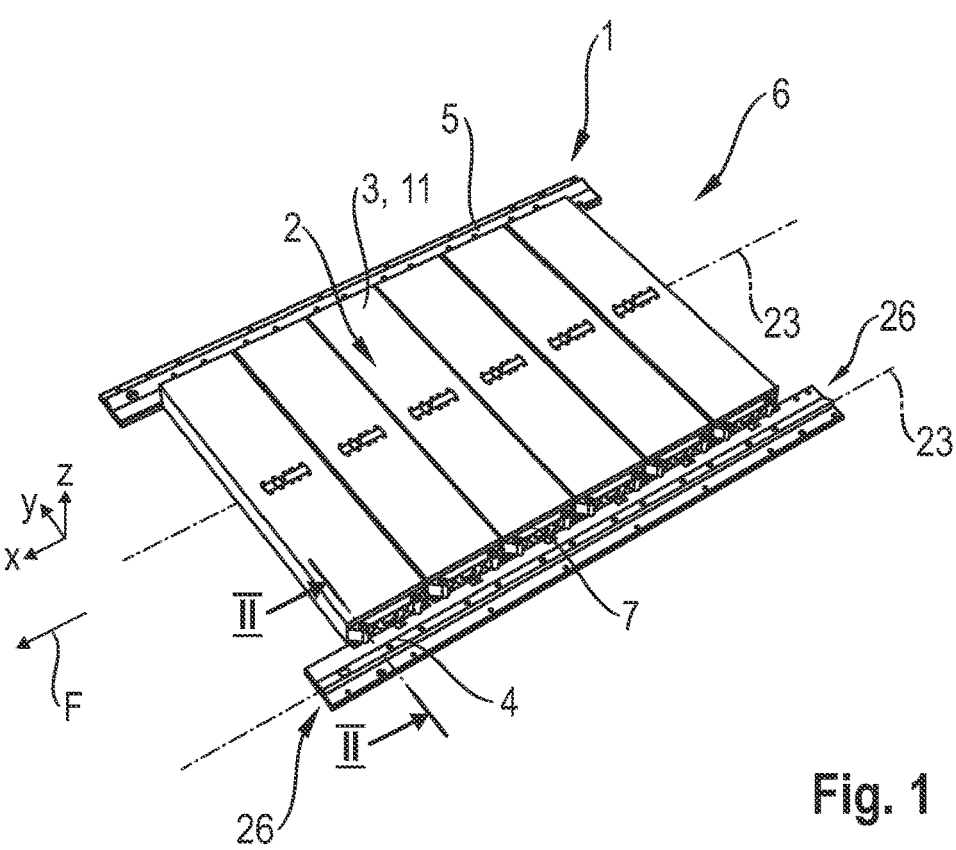
FIG. 1 in a perspective view, a traction battery system according to aspects of the invention in a first design example, FIG. 2 in a section II-II along a Y-Z body axis plane, the traction battery system according to FIG. 1, FIG. 3 in a section, the traction battery system according to aspects of the invention in a second design example, and FIG. 4 in a section IV-IV along a Y-Z body axis plane, the traction battery system according to FIG. 3.

A traction battery system 1 according to aspects of the invention of an electrically operable motor vehicle not shown in more detail is constructed as depicted in FIG. 1. In the present design example, the traction battery system 1 has six battery modules 2, each of which comprises a module housing 3 in which a plurality of battery cells are accommodated. It goes without saying that the number of battery modules 2 can be selected as desired, in particular taking into account a power output and an installation space of the motor vehicle. The traction battery system 1 is fastened to a first longitudinal support 4 and to a second longitudinal support 5, whereby the battery modules 2 are preferably oriented transverse to a direction of travel F of the motor vehicle. In other words, the battery modules 2 are accommodated in series transverse to the direction of travel F between the longitudinal supports 4, 5, whereby in each case, viewed in a serial manner, only one battery module 2 is disposed between the longitudinal supports 4, 5.

The two longitudinal supports 4, 5 are configured as mounting supports so that the traction battery system 1 can be mounted more easily on a body of the motor vehicle (not shown in more detail), because the use of the two longitudinal supports 4, 5, which are fastened to the body before the traction battery system 1 is connected, creates a motor vehicle module 6 on the traction battery system 1 which can easily be connected to the body in a simple way. The longitudinal supports 4, 5 can be fastened to rocker panels of the body, for example.

Facing the two longitudinal supports 4, 5, the individual module housings 3 each comprise a housing cover 7, which is held on a housing case 11 of the module housing 3, for example by means of a latching connection 8, and is preferably produced in an extrusion molding or extrusion process, preferably in the form of a hollow profile.

Figure 2:
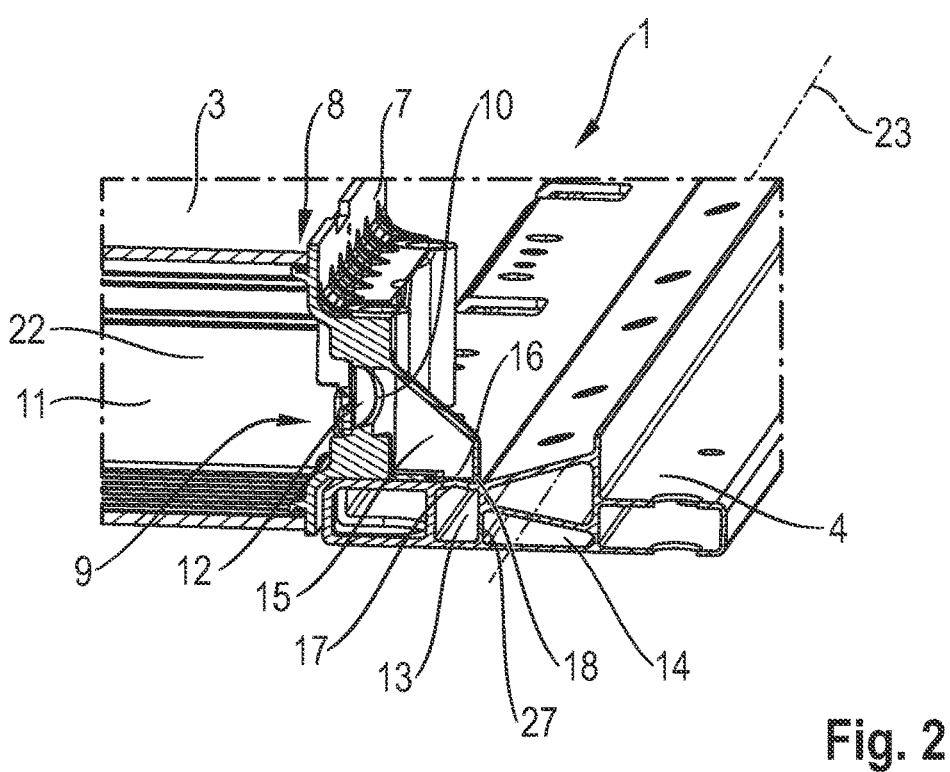

To discharge gases that can occur during operation of the traction battery system 1 when a battery cell degasses, for example due to a so-called thermal event, the battery module 2 comprises a venting unit 9 which has a vent opening 10, whereby the vent opening 10 is advantageously configured in the housing cover 7, as illustrated in FIG. 2. Both housing covers 7 associated with the module housing 3 can comprise a vent opening 10; it is also possible for only one of the two housing covers 7 to comprise a vent opening 10. The vent opening 10 could also be configured in a housing case 11 of the module housing 3.

An elastic bursting element 12 of the venting unit 9, which is in the form of a disc and can rupture above a particular pressure, is accommodated in the vent opening 10. The bursting element 12 can advantageously be configured in the form of a membrane, which ruptures at a specific pressure prevailing in the module housing 3. This means that, if there is a pressure in the module housing 3 the value of which corresponds to or exceeds a value of said specific pressure, the vent opening 10 is unblocked as a result of a rupture, or in other words a tearing, of the bursting element 12 and the gas can escape from the module housing 3.

For controlled discharge of the gas, the venting unit 9 comprises a vent chamber 13, in which gas flowing in via the vent opening 10 can be passed, preferably to an environment. In the present design example, the vent chamber 13 is configured in the longitudinal support 4; 5. In other words, the vent opening 10 is connected to the vent chamber 13 for throughflow, so that the gas can flow into the vent chamber 13 from the unblocked vent opening 10 in order to be passed on from there.

The longitudinal support 4; 5 is configured in the form of a longitudinal profile comprising at least one further chamber, a cooling chamber 14, whereby the chambers 13, 14 extend in the direction of a longitudinal axis 23 of the traction battery system 1, which also corresponds to a longitudinal axis of the longitudinal supports 4, 5. The longitudinal supports 4, 5 are produced in an extrusion molding or extrusion process, whereby the cooling chamber 14 is configured directly adjacent to the vent chamber 13. The cooling chamber 14 is configured separately from the vent chamber 13 by means of a support web 27.

A separate configuration of the cooling chamber 14 and the vent chamber 13 can be a completely independent configuration, or it can also be a configuration of the chambers 13, 14 separated by a wall as in the present design example, for example in the form of the support web 27.

The cooling chamber 14 comprises a coolant which is advantageously liquid or gaseous. The gas flowing in the vent chamber 13 is cooled by means of the coolant.

In the present design example, the housing cover 7 comprises an auxiliary channel 15 of the venting unit 9, which is configured to connect the vent opening 10 to the vent chamber 13 such that gas can flow through it. The auxiliary channel 15 further serves to deflect the flow, because the vent opening 10 is at virtually a right angle to an inflow opening 17 of the vent chamber 13. To prevent the gas from escaping upstream of the vent chamber 13 and downstream of the vent opening 10, a sealing element 18 is disposed between an auxiliary channel opening 16 of the auxiliary channel 15 which is configured facing toward the vent chamber 13 and the inflow opening 17.

The bursting element 12 is disposed on a side of the housing cover 7 which is configured facing toward the housing case 11, and is thus mounted in front of the auxiliary channel 15 in the flow direction of the gas, in other words, from an interior of the case 22 into the auxiliary channel 15.

Figure 3:
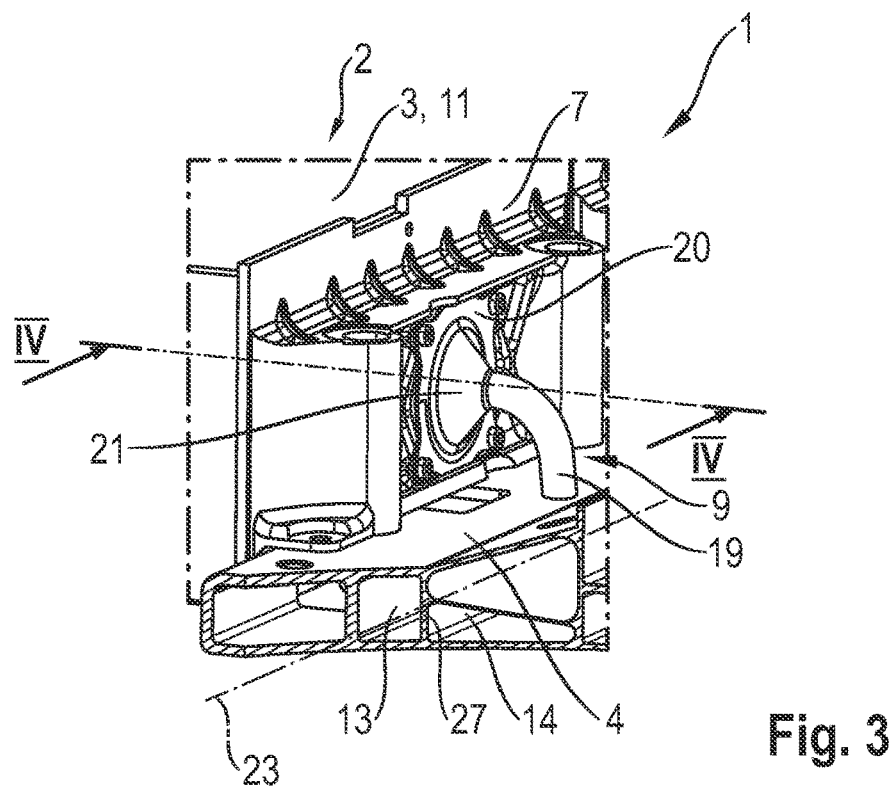
Figure 4:
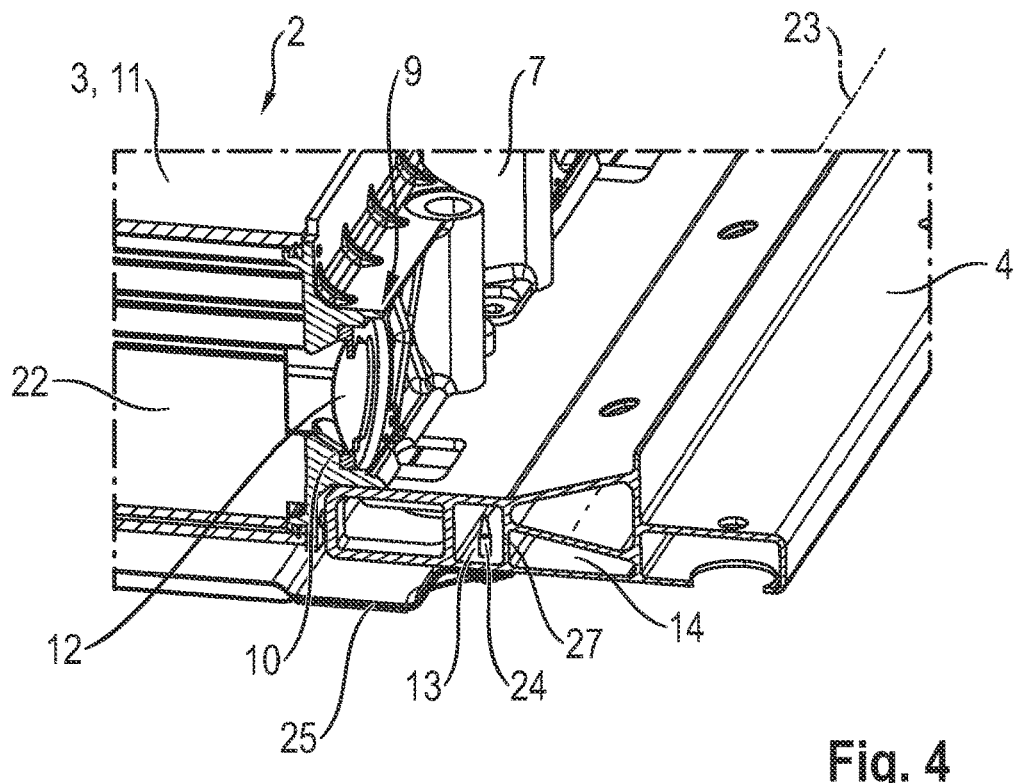

FIGS. 3 and 4 show the traction battery system 1 according to aspects of the invention in a second design example. The venting unit 9 comprises a hollow tube element 19 with a flange 20 which is configured facing toward the vent opening 10 for fastening the tube element 19, whereby the tube element 19 is configured to create the auxiliary channel 15. The tube element 19 has a funnel-shaped element section 21 which is configured facing toward the vent opening 10, by means of which an advantageous rapid discharge of the gas can be achieved. The sealing element 18 here could also be disposed between the tube element 19 and the inflow opening 15. The tube element 19 could also be configured as a hose, and thus be elastic.

The vent chamber 13, which, like the cooling chamber 14, extends in the direction of a longitudinal axis 23 of the longitudinal support 4; 5, is configured to accommodate a joining element 24 for holding a base plate 25 which covers the traction battery system 1 with respect to a driving surface. In other words, the vent chamber 13 comprises a joining surface.

At this point, it should be noted that the longitudinal axis 23 extends along a body longitudinal axis X, which is configured orthogonally to a body transverse axis Y and a body vertical axis Z, as illustrated in a Cartesian coordinate system in FIG. 1. The sections shown in FIGS. 2 and 4 are sections along a Y-Z body axis plane spanned by the body transverse axis Y and the body vertical axis Z. The respectively drawn section line is to be understood in accordance with this Y-Z body axis plane.

In a design example not shown in more detail, at one of its two ends 26, the longitudinal support 4; 5 comprises a cover element which completely closes the end 26 and a further cover element which closes at least the cooling chamber 14, so that the gas can flow in a directed manner via the end 26 which unblocks at least the vent chamber 13 and is preferably the end 26 which is configured opposite to the direction of travel. Or, in other words, the cover element is disposed on the end of the longitudinal support 4; 5 which is configured facing toward a body front of the motor vehicle for completely closing of said end.

In a further design example not shown in more detail, a valve, preferably a check valve, is configured between the vent opening 10 and the inflow opening 17, so that gas flowing through the vent chamber 13 can be prevented from flowing into one of the module housings 3.

The bursting element 12 advantageously has a higher pressure resistance with respect to a pressure applied to a side of the bursting element 12 which is configured facing away from the module housing 3 than with respect to a pressure applied to a side of the bursting element 12 which is configured facing toward the module housing 3, thereby preventing gas from flowing from the vent chamber 13 into another module housing 3. In other words, if one of the bursting elements 12 has ruptured, the gas exiting the module housing 3 associated with this bursting element 12 cannot flow into one of the other module housing 3.

LIST OF REFERENCE SYMBOLS

1 Traction battery system
2 Battery module
3 Module housing
4 First longitudinal support
5 Second longitudinal support
6 Motor vehicle module
7 Housing cover
8 Latching connection 9 Venting unit
10 Vent opening
11 Housing case
12 Bursting element
13 Vent chamber
14 Cooling chamber
15 Auxiliary channel
16 Auxiliary channel opening
17 Inflow opening
18 Sealing element
19 Tube element
20 Flange
21 Element Section
22 Interior of the case
23 Longitudinal axis
24 Joining element
25 Base plate
26 End
27 Support web
F Direction of travel
X Body longitudinal axis
Y Body transverse axis
Z Body vertical axis

What is claimed is:

1. A traction battery system for a motor vehicle, said traction battery system comprising:

at least two battery modules which each comprise (i) a plurality of batteries, (ii) a module housing comprising a housing case and at least one housing cover, said housing defining an enclosed chamber in which the plurality of batteries are positioned, and (iii) a venting unit incorporated into the housing cover, the venting unit having a vent opening and a bursting element to enable a discharge of gas from the module housing via the vent opening, a first longitudinal support and a second longitudinal support between which the battery modules are disposed, and wherein the longitudinal supports each have a vent chamber which is configured to receive and pass the gas flowing via the venting unit, and an auxiliary channel fluidly interconnecting the vent opening of the venting unit with the vent chamber, wherein, in a burst state of the bursting element, the auxiliary channel forms a defined and direct passageway between the vent chamber of one of the longitudinal supports and the enclosed chamber of the housing, wherein, for each longitudinal support, a cooling chamber which extends beside the vent chamber is configured separately from said vent chamber for cooling the gas flowing in the longitudinal support, wherein the auxiliary channel is a separate tube element that is mounted to (i) an outlet port formed in the housing cover and (ii) an inlet port formed in said one of the longitudinal supports.

2. The traction battery system according to claim 1, wherein each longitudinal support comprises a respective cooling chamber.

3. The traction battery system according to claim 1, wherein the cooling chamber is configured adjacent to the vent chamber.

4. The traction battery system according to claim 1, wherein the cooling chamber comprises a cooling medium.

5. The traction battery system according to claim 1, wherein each longitudinal support is produced using a method of extrusion molding or in an extrusion process.

6. The traction battery system according to claim 1, wherein the battery modules are disposed in series and transverse to a direction of travel of the motor vehicle between the longitudinal supports, wherein, in each case, only one battery module is accommodated in series between the longitudinal supports along a longitudinal axis of the traction battery system.

7. The traction battery system according to claim 1, wherein the housing case is produced in an extrusion process in a form of a hollow profile and is configured to be closed on at least one open end of the housing case by the housing cover.

8. The traction battery system according to claim 1, further comprising a joining element disposed in the vent chamber.

9. The traction battery system according to claim 1, wherein the vent chamber is completely closed at an end of the vent chamber that faces toward a body front of the motor vehicle.

10. A motor vehicle comprising the traction battery system of claim 1.

11. The traction battery system according to claim 1, wherein the housing cover includes a flange that rests on said one of the longitudinal supports.

12. The traction battery system according to claim 1, wherein the vent chamber and the cooling chamber are separated by a single wall.

13. The traction battery system according to claim 1, wherein the vent chamber and the cooling chamber are separated by a single wall of said one of the longitudinal supports.

14. A traction battery system for a motor vehicle, said traction battery system comprising:

at least two battery modules which each comprise (i) a plurality of batteries, (ii) a module housing comprising a housing case and at least one housing cover, said housing defining an enclosed chamber in which the plurality of batteries are positioned, and (iii) a venting unit incorporated into the housing cover, the venting unit having a vent opening and a bursting element to enable a discharge of gas from the module housing via the vent opening, a first longitudinal support and a second longitudinal support between which the battery modules are disposed, and wherein the longitudinal supports each have a vent chamber which is configured to receive and pass the gas flowing via the venting unit, and an auxiliary channel fluidly interconnecting the vent opening of the venting unit with the vent chamber, wherein, in a burst state of the bursting element, the auxiliary channel forms a defined and direct passageway between the vent chamber of one of the longitudinal supports and the enclosed chamber of the housing, wherein, for each longitudinal support, a cooling chamber which extends beside the vent chamber is configured separately from said vent chamber for cooling the gas flowing in the longitudinal support, wherein the auxiliary channel is a channel that is integrally formed within the housing cover.

15. The traction battery system according to claim 14, further comprising a sealing element disposed between the auxiliary channel and the vent chamber.

16. The traction battery system according to claim 14, further comprising a valve disposed in the auxiliary channel.

17. The traction battery system according to claim 14, further comprising a sealing element disposed over the vent chamber, and wherein the auxiliary channel extends between the bursting element and the sealing element.

* * * * *